(12) United States Patent
Tsuchiya (10) Patent No.: US 6,697,212 B2
(45) Date of Patent: Feb. 24, 2004

(54) CARTRIDGE MAGNETIC TAPE DEVICE HAVING MAGNETIC HEAD CLEANING MECHANISM

(75) Inventor: Manabu Tsuchiya, Yonezawa (JP)

(73) Assignee: NEC Corporation, Tokyo (JP)

( * ) Notice: Subject to any disclaimer, the term of this patent is extended or adjusted under 35 U.S.C. 154(b) by 58 days.

(21) Appl. No.: 10/161,683

(22) Filed: Jun. 5, 2002

(65) Prior Publication Data

US 2002/0181145 A1 Dec. 5, 2002

(30) Foreign Application Priority Data

Jun. 5, 2001 (JP) ........................................ 2001-168998

(51) Int. Cl.⁷ ................................................ G11B 5/41
(52) U.S. Cl. ........................................ 360/95; 360/128
(58) Field of Search ........ 360/95, 128; 242/332–332.8, 242/348–348.4; 15/DIG. 12

(56) References Cited

U.S. PATENT DOCUMENTS

| | | | | |
|---|---|---|---|---|
| 5,463,519 A | * | 10/1995 | Dodt et al. ................. | 360/128 |
| 6,067,211 A | * | 5/2000 | Chliwnyj et al. ........... | 360/128 |
| 6,067,212 A | * | 5/2000 | Poorman .................... | 360/128 |
| 6,215,618 B1 | * | 4/2001 | Anderson et al. ........... | 360/128 |

FOREIGN PATENT DOCUMENTS

| | | |
|---|---|---|
| JP | 6-131637 | 5/1994 |
| JP | 11-328635 | 11/1999 |
| JP | 2000-149236 | 5/2000 |

\* cited by examiner

*Primary Examiner*—A. J. Heinz
*Assistant Examiner*—Angel Castro
(74) *Attorney, Agent, or Firm*—Young & Thompson

(57) ABSTRACT

A threading motor (5) fixed to a deck base (2) has a gear at the tip of the shaft thereof, and rotates a drive shaft (6-1) through the gear secured to tip of the drive shaft. The drive shaft is rotatably secured to the deck base, and a drive arm (6) is secured to the tip of the drive shaft. A threading arm (7) is rotatably secured to the tip of the drive arm through a pin, and a threading pin (7-1) is fixed to the tip of the threading arm. The threading pin has a bearing (7-2) at the upper portion thereof, and moves along a guide (3-1) formed on a guide plate (3) fixed on the deck base. When the threading motor rotates, a leader block (8) passes the front side of the magnetic head (4) while drawing out a magnetic tape (1-1). At this time, a head portion (4-1) of a magnetic head (4) is cleaned by a brush (8-2) fixed to a leader block (8).

9 Claims, 9 Drawing Sheets

CARTRIDGE MAGNETIC TAPE DEVICE HAVING MAGNETIC HEAD CLEANING MECHANISM

BACKGROUND OF THE INVENTION

1. Field of the Invention

The present invention relates to a cartridge magnetic tape device, especially to a mechanism for cleaning a magnetic head of the cartridge magnetic tape device.

2. Description of the Related Art

A cleaning operation for a magnetic head is indispensable to implement more stable reading/writing (R/W) operations from/into a magnetic tape. For example, in a magnetic head cleaning mechanism of a magnetic tape device disclosed in JP(A)-6-131637, a cleaning member is disposed out of a threading track. When a magnetic head is cleaned, the cleaning member is moved by a threader arm so that the cleaning member comes into contact with the magnetic head, and then the threader arm is reciprocally moved with a predetermined stroke, whereby the magnetic head is rubbed by the cleaning member.

In order to satisfy recent requirements of low-cost and little-space design for devices (that is, requirements of reducing the manufacturing cost and also reducing the size of the device), the number of parts is needed to be reduced by simplifying the mechanism itself (integration of mechanisms or the like).

SUMMARY OF THE INVENTION

Therefore, an object of the present invention is to integrate a threading mechanism and a magnetic head cleaning mechanism so that the head portion of a magnetic head is cleaned by a brush provided to a leader block for threading the magnetic tape when the leader block passes the front side of the magnetic head.

In order to attain the above object, according to the present invention, there is provided a magnetic tape device comprising:

a magnetic head;

a threading arm;

a threading motor for driving the threading arm;

a threading pin attached to the threading arm;

a guide along which the threading pin is moved in connection with driving of the threading arm; and a leader block attached to the threading pin for drawing out a leader pin from a magnetic tape cartridge, the leader pin being fixed at a tip of a magnetic tape accommodated in the magnetic tape cartridge, wherein the leader block has a brush for cleaning the magnetic head by contacting therewith.

In an aspect of the present invention, the threading arm is driven through both a drive shaft driven by the threading motor and a drive arm one end of which is secured to the drive shaft while another end of which is rotatably connected to the threading arm. In an aspect of the present invention, the leader block is rotatably attached to the threading pin. In an aspect of the present invention, the threading pin has a bearing by which the threading pin is moved along the guide.

In an aspect of the present invention, the magnetic tape device further comprises a sensor for detecting the threading pin, especially the bearing thereof, at a position where the brush is brought into contact with the magnetic head, wherein the threading motor is stopped on the basis of detection result, and the magnetic head is moved across a direction of magnetic tape threading.

In an aspect of the present invention, the frequency of movement of the magnetic head is set in accordance with dirt degree of the magnetic head. In an aspect of the present invention, the magnetic tape device further comprises a lead screw for moving the magnetic head, and a motor for rotating the lead screw, wherein the motor is forwardly and inversely rotated to move the magnetic head along the lead screw, or, further comprises a voice coil for moving the magnetic head.

According to the present invention, the mechanism for cleaning the magnetic head and the magnetic tape threading mechanism are integrated, and thus it is unnecessary to provide a cleaning mechanism independently, so that the number of parts can be reduced and the little-space design of the device can be implemented.

DETAILED DESCRIPTION OF THE PREFERRED EMBODIMENTS

Preferred embodiments according to the present invention will be described hereunder with reference to the accompanying drawings.

Figure 1A:
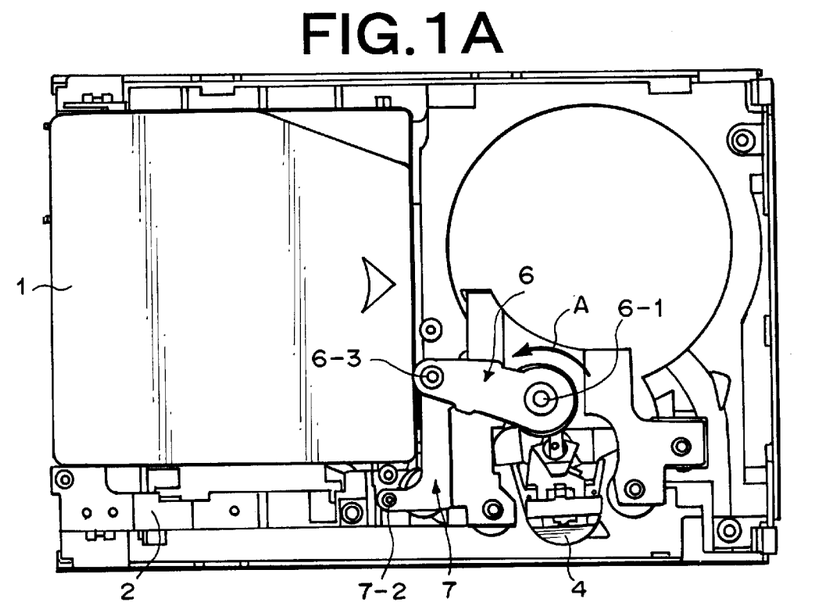
FIGS. 1A, 1B and 1C are a plan view, front view and rear view, respectively, showing a cartridge magnetic tape device according to the present invention, in which a guide plate is removed.
Figure 1B:
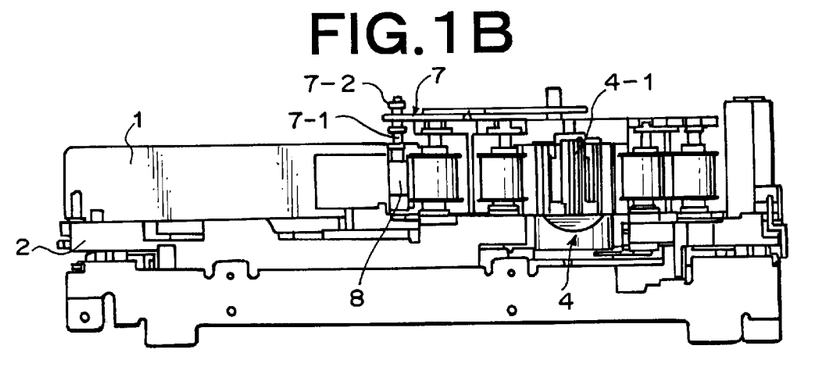
Figure 1C:
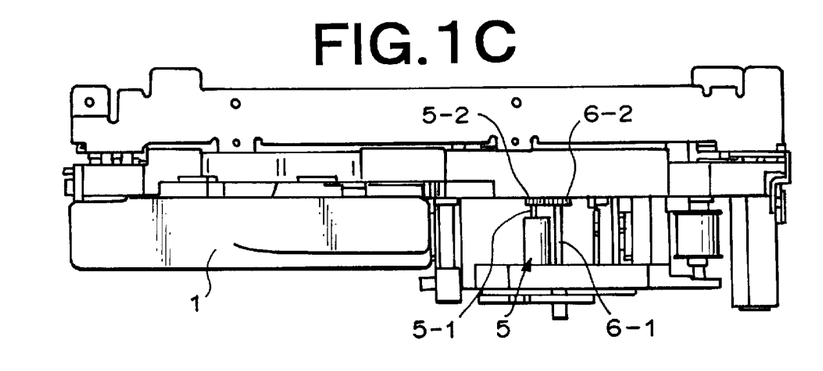
Figure 2A:
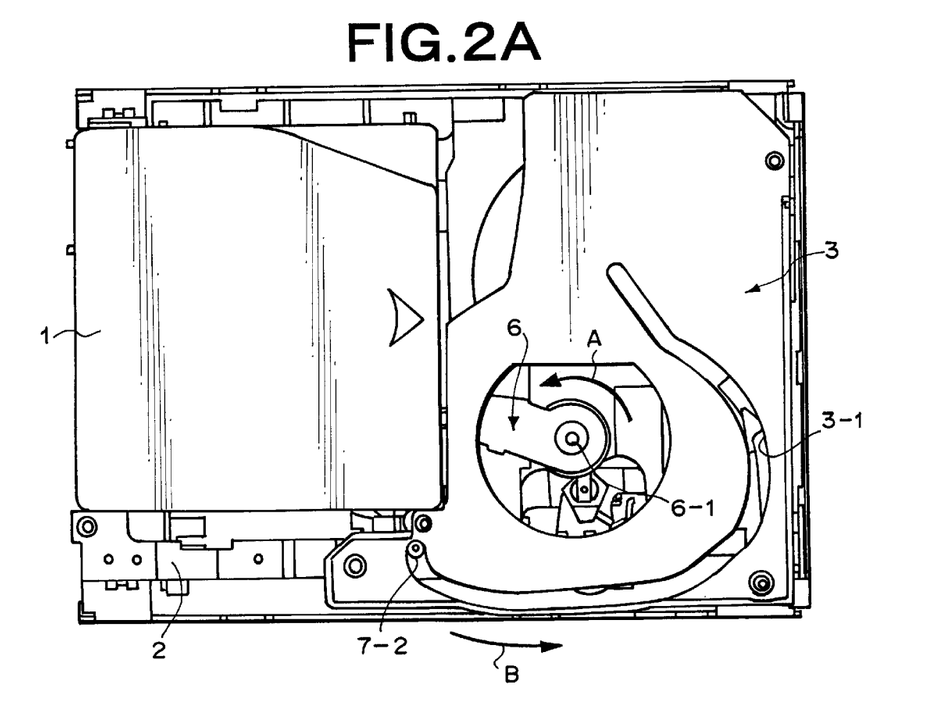
FIGS. 2A and 2B are a plan view and front view, respectively, showing the cartridge magnetic tape device of FIGS. 1A, 1B and 1C.
Figure 2B:
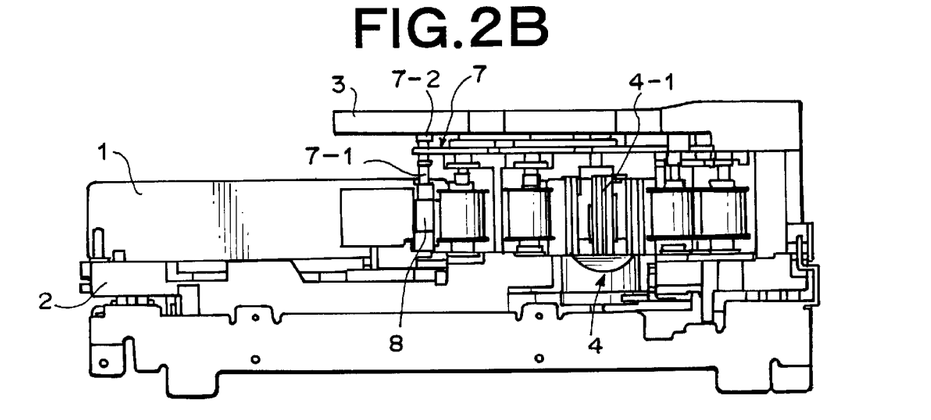

FIGS. 2A and 2B are a plan view and front view, respectively, showing a cartridge magnetic tape device according to the present invention, and, FIGS. 1A, 1B and 1C are a plan view, front view and rear view, respectively, showing the cartridge magnetic tape device of FIGS. 2A and 2B, in which a guide plate is removed. A magnetic tape cartridge 1 is loaded on a deck base 2 at a predetermined position for tape threading.

Figure 4A:
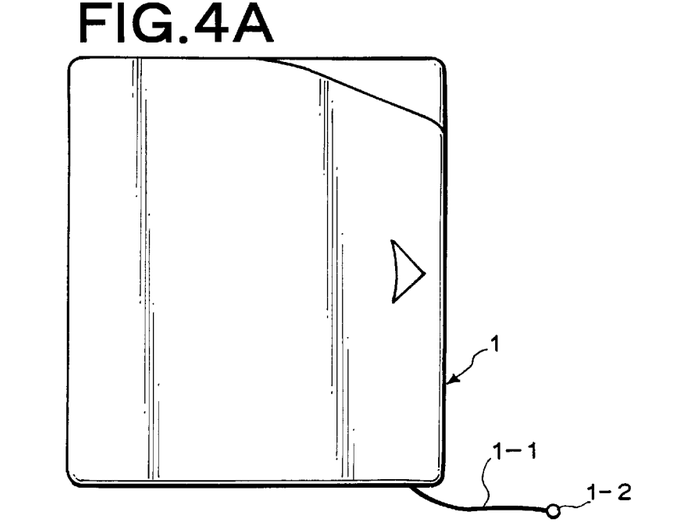
FIGS. 4A and 4B are a plan view and front view showing a magnetic tape cartridge in which a magnetic tape having a leader pin is accommodated.
Figure 4B:
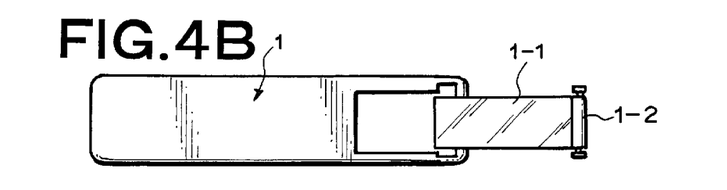

FIGS. 4A and 4B are a plan view and front view showing the magnetic tape cartridge 1. In the magnetic tape cartridge 1, a magnetic tape 1—1 is accommodated at a taken-up form. A leader pin 1-2 is secured to the tip of the magnetic tape 1—1.

In FIG. 1C, reference numeral 5 represents a threading motor fixed onto the deck base 2, reference numeral 5-1 represents a shaft of the threading motor 5 extending in vertical direction, and reference numeral 5-2 represents a gear fixed to the tip of the shaft 5-1. Reference numeral 6-1 represents a drive shaft extending in vertical direction and rotatably secured to the deck base 2, and reference numeral 6-2 represents a gear secured to the tip of the drive shaft 6-1 and engaged with the gear 5-2.

As shown in FIGS. 1A and 2A, one end portion of a drive arm 6 is secured to the tip of the drive shaft 6-1, Further, as shown in FIG. 1A, to another end portion of the drive arm 6 one end portion of a threading arm 7 is rotatably secured through a pin 6-3 extending in vertical direction, and to another end portion of the threading arm 7 a threading pin 7-1 extending in vertical direction is attached. As shown in FIGS. 1B and 2B, the threading pin 7-1 has a bearing 7-2 at the upper portion thereof, and a leader block 8 is rotatably secured to the threading pin 7-1. A magnetic head 4 is fixed on the deck base 2. Reference numeral 4-1 represents a head portion of the magnetic head 4 on which the magnetic tape 1—1 is threaded. As shown in FIG. 2A, the bearing 7-2 fits into a guide 3-1 formed on a guide plate 3 which is secured to the deck base 2.

Figure 3:
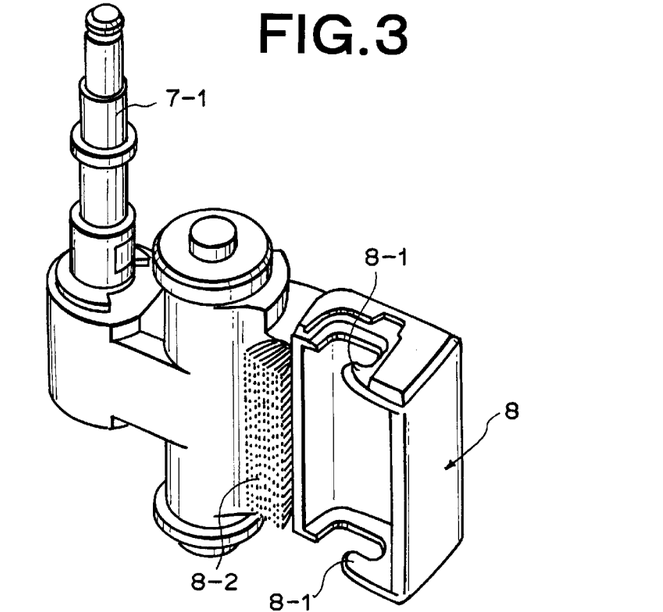
FIG. 3 is a perspective view showing a leader block having a brush.

FIG. 3 is a perspective view showing the leader block 8. The leader block 8 is equipped with pawls 8-1 which are hooked to the leader pin 1-2 fixed to the tip of a magnetic tape 1—1, and also with a brush 8-2 for cleaning the head portion 4-1 of the magnetic head 4.

When the threading motor 5 rotates, the shaft 5-1 and gear 5-2 are rotated, thereby rotating the gear 6-2 and drive shaft 6-1, and the drive arm 6 is rotated in the direction indicated by an arrow A. In connection with the rotation of the drive arm 6, the threading arm 7 is also moved. At this time, since the movement of the threading arm 7 is restricted by the guide 3-1 of the guide plate 3, the threading pin 7-1 secured to the threading arm 7 is moved in the direction indicated by an arrow B along the guide 3-1, and the leader block 8 which is rotatably secured to the threading pin 7-1 is also moved in the direction indicated by the arrow B.

Through the series of operations as described above, the leader pin 1-2 hooked to the pawls 8-1 of the leader block 8 is drawn out from the magnetic tape cartridge 1.

Figure 5A:
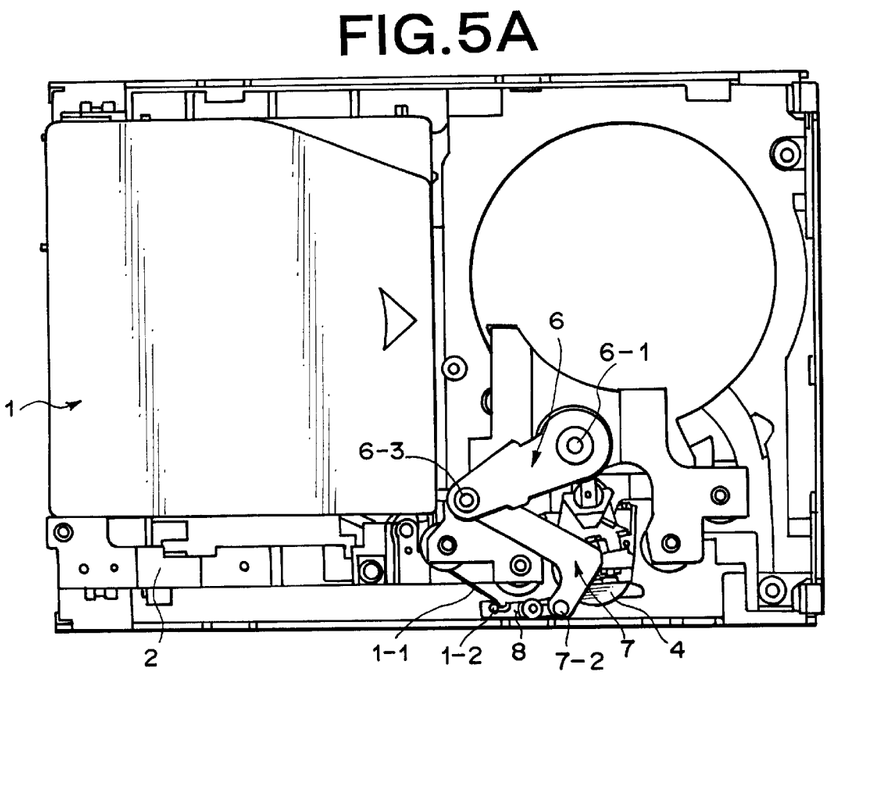
FIGS. 5A and 5B are a plan view and front view, respectively, showing the cartridge magnetic tape device, which show an approaching operation of the leader block to the magnetic head, in which the guide plate is removed.
Figure 5B:
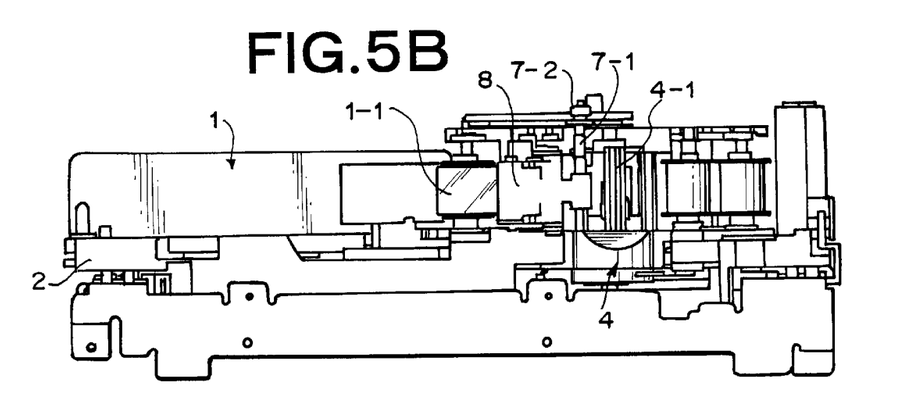
Figure 6A:
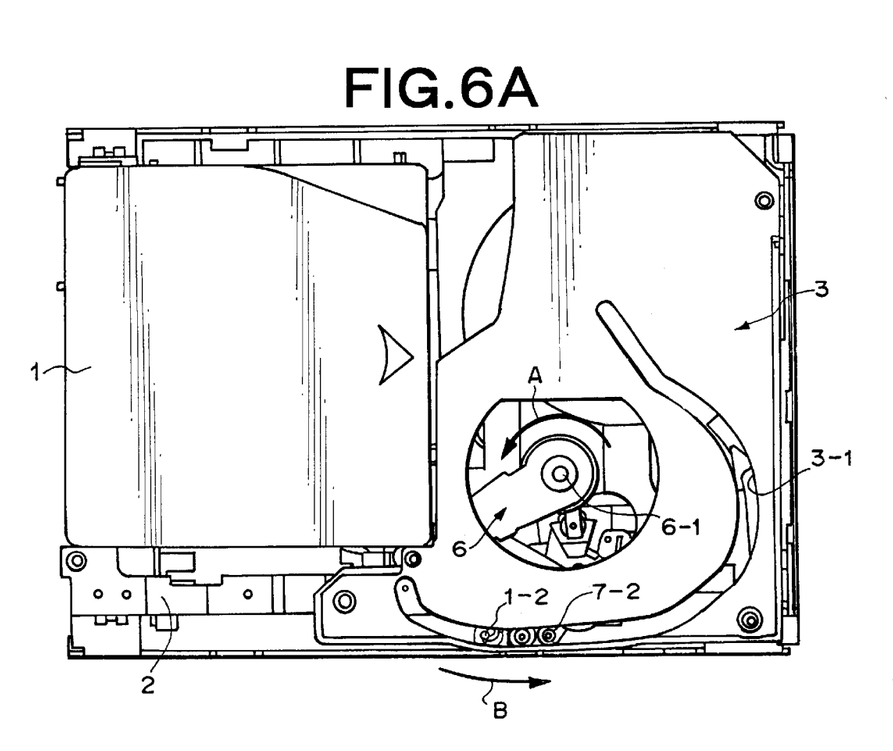
FIGS. 6A and 6B are a plan view and front view, respectively, showing the cartridge magnetic tape device of FIGS. 5A and 5B, which clearly show a guide along which a threading pin having a bearing is moved, and also show the approaching operation of the leader block to the magnetic head.
Figure 6B:
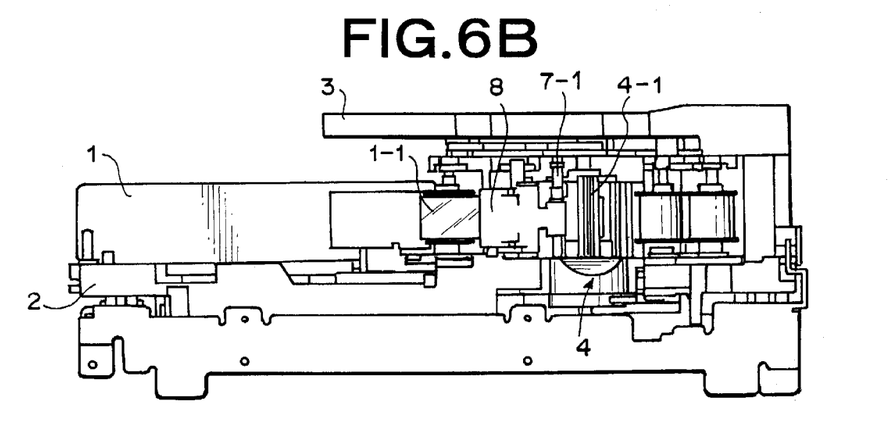

FIGS. 6A and 6B are a plan view and front view, respectively, showing the cartridge magnetic tape device according to the present invention to explain an approaching operation of the leader block to the magnetic head, and, FIGS. 5A and 5B are a plan view and front view, respectively, showing the cartridge magnetic tape device of FIGS. 6A and 6B, in which the guide plate is removed. FIG. 6A clearly shows that the bearing 7-2 at the upper portion of the threading pin 7-1 is moved in the direction of the arrow B along the guide 3-1. The magnetic tape 1—1 drawn out of the magnetic tape cartridge 1 is shown in FIGS. 5A, 5B and 6B.

When the threading motor 5 further rotates, the leader block 8 passes the front side of the magnetic head 4 while drawing out the magnetic tape 1—1. At this time, the head portion 4-1 is cleaned by the brush 8-2 fixed to the leader block 8.

Figure 7A:
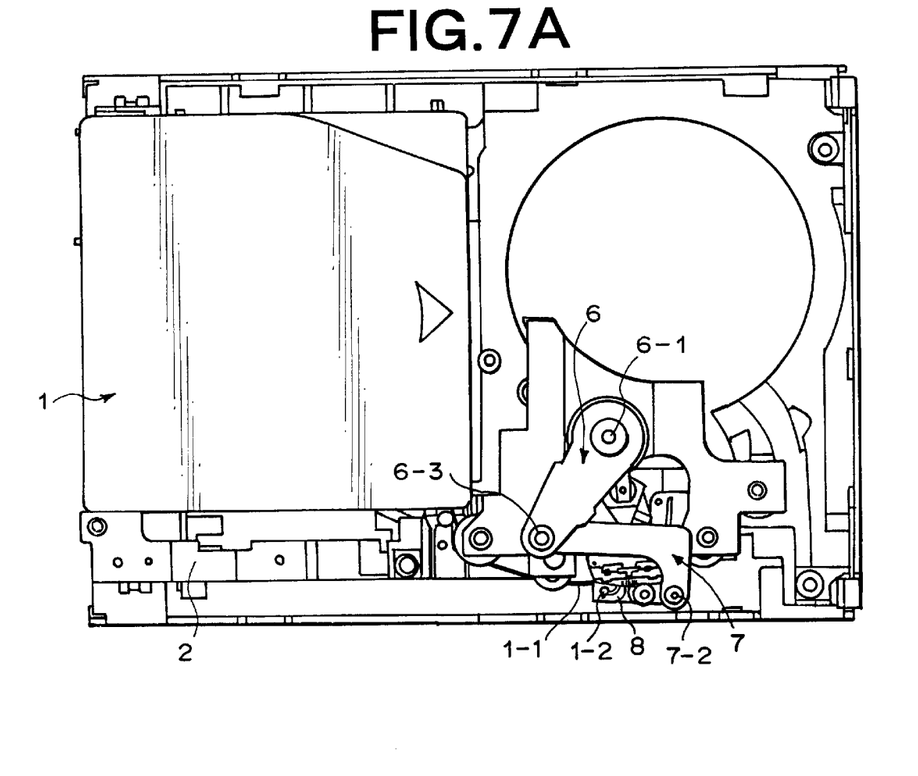
FIGS. 7A and 7B are a plan view and front view, respectively, showing the cartridge magnetic tape device, which show a contact operation of the leader block to the magnetic head, in which the guide plate is removed.
Figure 7B:
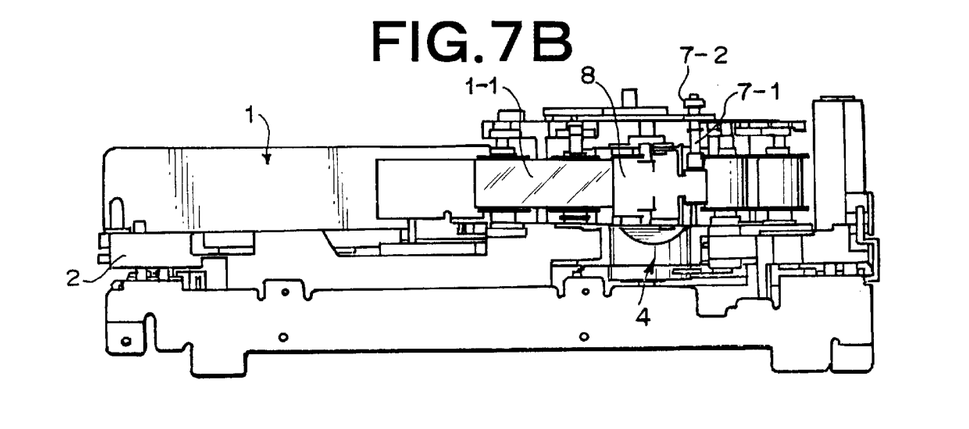
Figure 8A:
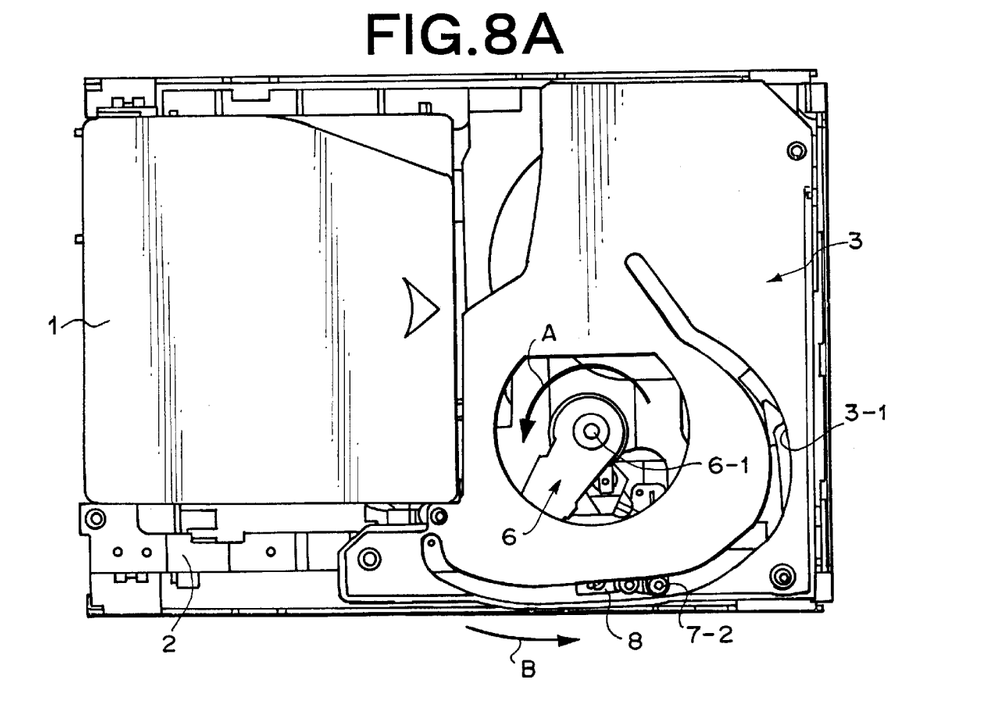
FIGS. 8A and 8B are a plan view and front view, respectively, showing the cartridge magnetic tape device of FIGS. 7A and 7B, which clearly show the guide, and also show the contact operation of the leader block to the magnetic head.
Figure 8B:
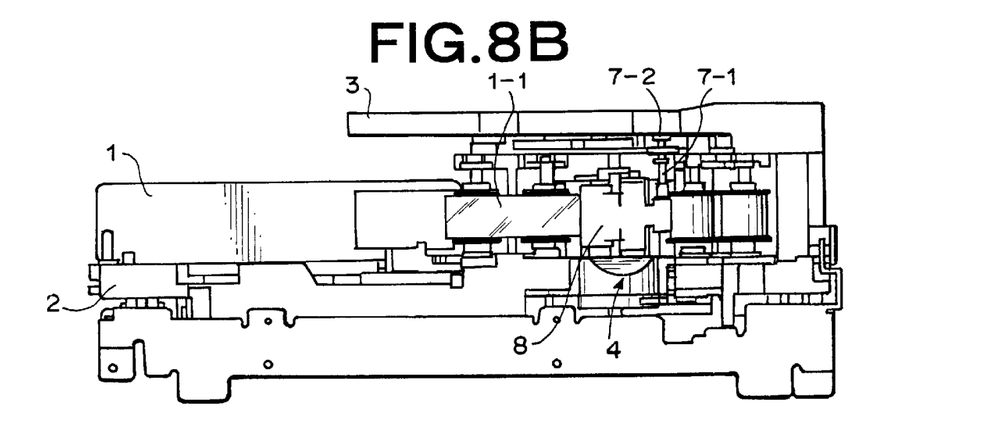

FIGS. 8A and 8B are a plan view and front view, respectively, showing the cartridge magnetic tape device according to the present invention at the time when the brush 8-2 passes the head portion 4-1, and, FIGS. 7A and 7B are a plan view and front view, respectively, showing the cartridge magnetic tape device of FIGS. 8A and 8B, in which the guide plate is removed. FIG. 8A clearly shows that the bearing 7-2 at the upper portion of the threading pin 7-1 is moved in the direction of the arrow B along the guide 3-1.

Figure 9:
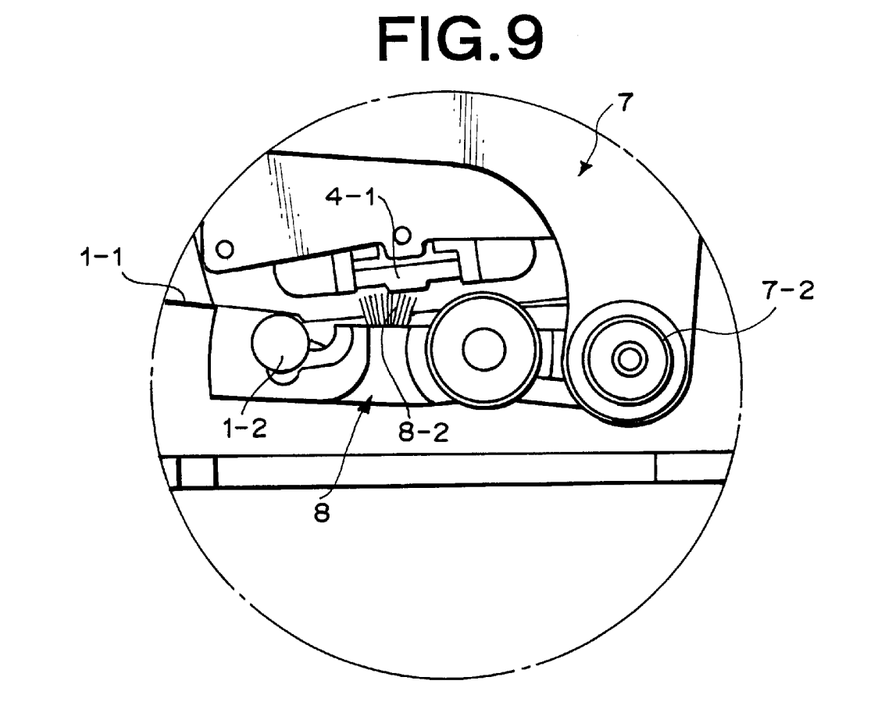
FIG. 9 is an enlarged plan view showing the contact operation of the leader block to the magnetic head.

FIG. 9 is an enlarged plan view when the brush 8-2 and the head portion 4-1 are brought into contact with each other. The head portion 4-1 is cleaned through the contact between the brush 8-2 and the head portion 4-1. That is, at the time when the leader block 8 for threading the magnetic tape 1—1 passes the front side of the magnetic head 4, the head portion 4-1 is cleaned by a brush equipped to the leader block 8.

Figure 10A:
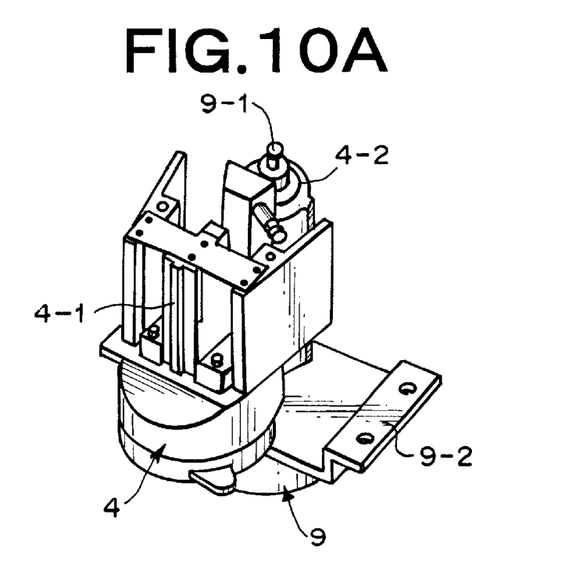
FIGS. 10A and 10B are a perspective view and front view, respectively, showing an upwardly and downwardly movable magnetic head.
Figure 10B:
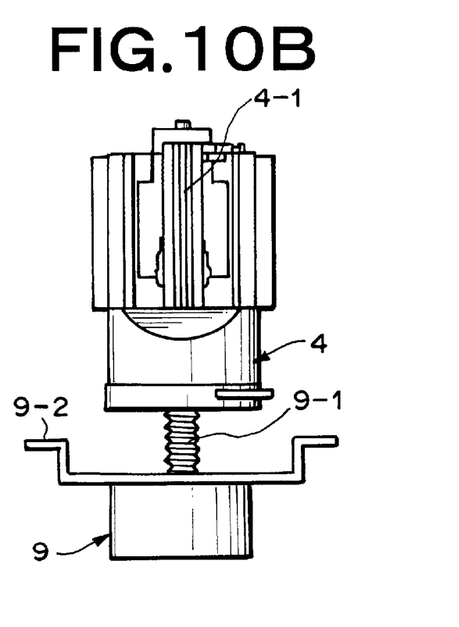
Figure 11A:
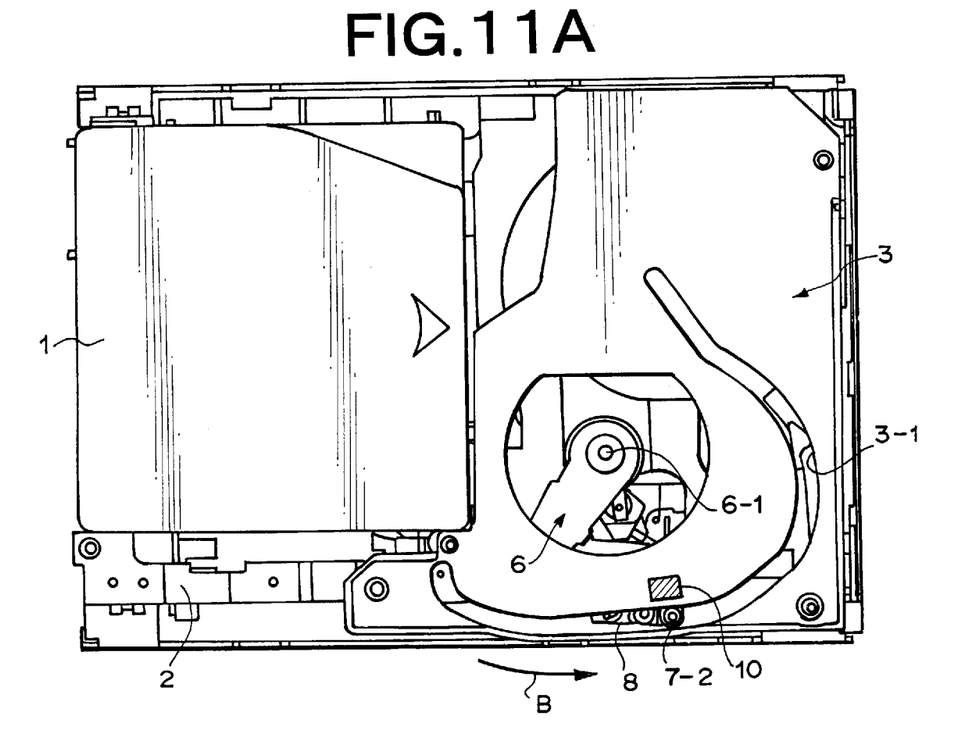
FIGS. 11A and 11B are a plan view and front view, respectively, showing another embodiment of the cartridge magnetic tape device according to the present invention in which a sensor for detecting the bearing of the threading pin and the magnetic head of FIGS. 10A and 10B are used.
Figure 11B:
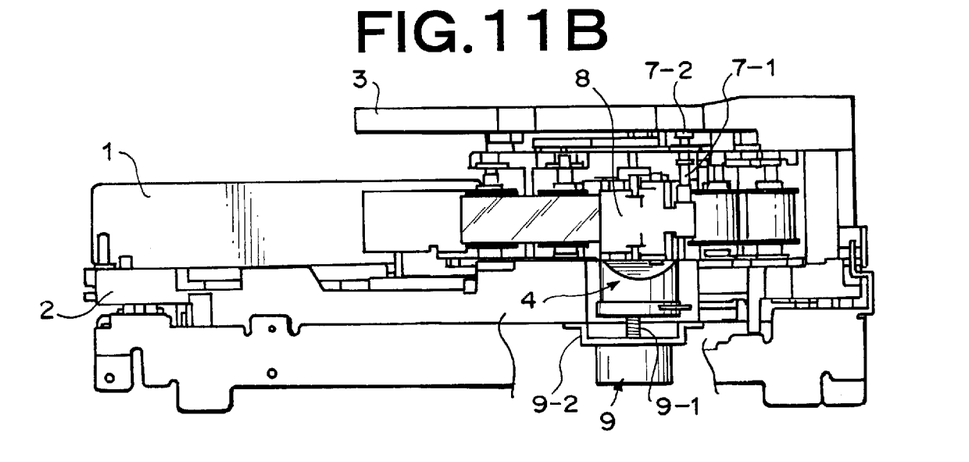

FIGS. 10A and 10B are a perspective view and front view, respectively, showing a magnetic head according to another embodiment of the present invention. FIGS. 11A and 11B are a plan view and front view, respectively, showing the embodiment of the cartridge magnetic tape device according to the present invention in which the magnetic head of FIGS. 10A and 10B is used.

In this embodiment, the magnetic head 4 is upwardly/downwardly, i.e. vertically, moved in the cleaning operation. Accordingly, the magnetic head 4 can be more effectively cleaned. Specifically, a motor 9 for moving the magnetic head 4 upwardly/downwardly is fixed on a bracket 9-2 secured to the deck base 2, and the magnetic head 4 is moved upwardly/downwardly through a lead screw 9-1 extending in vertical direction and engaged with a nut 4-2 fixed to the magnetic head 4 when the motor 9 rotates in both rotational directions alternately.

Further, as shown in FIG. 11A, a sensor 10 is disposed at such a position on the guide plate 3 that it detects the position of the bearing 7-2 when the brush 8-2 is located in front of the head portion 4-1. When the sensor 10 detects the position of the bearing 7-2, the threading motor 5 is temporarily stopped. Thereafter, the motor 9 rotates forwardly and inversely, i.e. in both the rotational directions, to move the magnetic head 4 upwardly and downwardly, and the head portion 4-1 of the magnetic head 4 is cleaned by the brush 8-2.

As described above, the cleaning operation is carried out while the brush 8-2 is stopped and the magnetic head 4 is moved upwardly and downwardly, so that the frequency of the cleaning can be set to any value. Accordingly, when the magnetic head is remarkably dirty, the effective operation can be performed.

In place of the motor 9, a voice coil may be used to move the magnetic head 4 upwardly and downwardly to achieve the same effect.

What is claimed is:

1. A magnetic tape device comprising:
   a magnetic head;
   a threading arm;
   a threading motor for driving the threading arm;
   a threading pin attached to said threading arm;
   a guide along which said threading pin is moved in connection with driving of said threading arm; and a leader block attached to said threading pin for drawing out a leader pin from a magnetic tape cartridge, said leader pin being fixed at a tip of a magnetic tape accommodated in the magnetic tape cartridge, wherein said leader block has a brush for cleaning said magnetic head by contacting therewith.

2. The magnetic tape device as claimed in claim 1, wherein said threading arm is driven through both a drive shaft driven by said threading motor and a drive arm one end of which is secured to the drive shaft while another end of which is rotatably connected to said threading arm.

3. The magnetic tape device as claimed in claim 1, wherein said leader block is rotatably attached to said threading pin.

4. The magnetic tape device as claimed in claim 1, wherein said threading pin has a bearing by which the threading pin is moved along said guide.

5. The magnetic tape device as claimed in claim 4, further comprising a sensor for detecting said bearing at a position where said brush is brought into contact with said magnetic head, wherein said threading motor is stopped on the basis of detection result, and said magnetic head is moved across a direction of magnetic tape threading.

6. The magnetic tape device as claimed in claim 1, further comprising a sensor for detecting said threading pin at a position where said brush is brought into contact with said magnetic head, wherein said threading motor is stopped on the basis of detection result, and said magnetic head is moved across a direction of magnetic tape threading.

7. The magnetic tape device as claimed in claim 6, wherein the frequency of movement of said magnetic head is set in accordance with dirt degree of said magnetic head.

8. The magnetic tape device as claimed in claim 6, further comprising a lead screw for moving said magnetic head, and a motor for rotating said lead screw, wherein said motor is forwardly and inversely rotated to move said magnetic head along said lead screw.

9. The magnetic tape device as claimed in claim 6, further comprising a voice coil for moving said magnetic head.

* * * * *